Patented Feb. 6, 1934

1,946,002

UNITED STATES PATENT OFFICE 1,946,002

AGE-RESISTING VULCANIZED RUBBER PRODUCT

Robert L. Sibley, Nitro, W. Va., assignor to The Rubber Service Laboratories Company, Akron, Ohio, a corporation of Ohio No Drawing. Application April 15, 1931
Serial No. 530,438

20 Claims. (Cl. 18—50)

The present invention relates to a process for the manufacture of vulcanized rubber and the products obtained thereby. More particularly, the invention is directed to the use in a rubber mix of an anti-oxidant or compound which imparts age resisting properties to the vulcanized rubber product.

It is well known that rubber deteriorates rapidly when exposed to air, heat and sunlight, and that such deterioration is characterized by a loss in the tensile strength, resiliency and other desirable properties of the material. It has been found according to the present invention that such deterioration can be very greatly lessened if there be incorporated in the rubber mix a compound of the class hereinafter set forth.

The age resisting characteristics of a vulcanized rubber product can be readily ascertained by subjecting the vulcanized product to an accelerated aging test wherein portions of the cured rubber product are subjected in a bomb to the action of oxygen under pressure and maintained for several hours at an elevated temperature. The treated samples are then examined and tested and the results so obtained compared with similar results obtained by testing the unaged vulcanized stock. The deterioration in properties suffered as a result of from 18 to 39 hours of the oxidation treatment at a pressure of 300 pounds of oxygen is indicative of the result that would normally be expected from that particular stock during approximately two to three years of natural aging. Such a test is known as the Bierer-Davis aging test.

The new class of anti-oxidant or age resisting materials which have been found upon incorporation into a rubber stock to impart such excellent age resisting qualities to the vulcanized product that portions thereof, when subjected to the artificial aging tests described, undergo only a relatively small loss in tensile strength and other qualities, is obtained by condensing substantially two molecular proportions of a naphthol with substantially one molecular proportion of an aldehyde containing more than one carbon atom and reacting the product thus formed with substantially two molecular proportions of an aromatic amine.

One method whereby one of the preferred class of anti-oxidants, for example, an aniline derivative of a reaction product of beta-naphthol and butyraldehyde, was prepared follows:

Substantially two molecular proportions of beta-naphthol was dissolved in a suitable solvent, for example, ethyl alcohol. Substantially one molecular proportion of butyraldehyde was then added, and the mixture stirred preferably in the presence of sodium acetate for a period of approximately one to three hours. The alcohol and any excess of butyraldehyde was then removed, preferably by distillation. The residue may be purified if desired by digesting preferably with water and then with benzol. Substantially one molecular proportion of the reaction product thus formed and an excess over two molecular proportions of aniline were then placed in a suitable container and heated, preferably in the presence of aniline hydrochloride, at a temperature of approximately 180 to 200° C. with agitation for substantially 18 hours. After cooling to room temperature, the excess of unreacted aniline was removed by steam distillation, and/or, if convenient or desirable, by washing with a dilute acid, for example, hydrochloric acid, and then washing the product with water.

The product prepared as described above was compounded in the well known manner in a typical rubber tread stock comprising

| | | |
|---|---|---|
| 100 | parts of | smoked sheet rubber, |
| 40 | " " | carbon black, |
| 10 | " " | zinc oxide, |
| 2 | " " | a blended mineral oil and rosin, |
| 3.25 | " " | sulfur, |
| 1 | part " | diphenylguanidine, |
| 1 | " " | the aniline derivative of the reaction product of beta-naphthol and butyraldehyde, prepared as described above. |

The stock thus formed was then vulcanized by heating sheets of the said stock in a press in the well known manner for different periods of time at the temperature given by 40 pounds of steam pressure per square inch. Portions of the stock cured in the manner as described were then artificially aged by heating in an oxygen bomb in the manner described for 39 hours at a temperature of 70° C. and an oxygen pressure of 300 pounds per square inch. A comparison between the tensile and modulus properties of the aged and unaged vulcanized rubber product so obtained is given in Table I.

Table I

| Cure mins. | Hours aged | Modulus of elasticity in lbs/in² at elongations of— | | Tensile at break in lbs/in² | Ultimate elongation % |
|---|---|---|---|---|---|
| | | 300% | 500% | | |
| 30 | 0 | 970 | 2475 | 3660 | 660 |
| 30 | 39 | 856 | 1885 | 2195 | 580 |
| 60 | 0 | 1375 | 3235 | 4340 | 640 |
| 60 | 39 | 1200 | 2465 | 2925 | 585 |
| 90 | 0 | 1660 | 3660 | 4530 | 610 |
| 90 | 39 | 1415 | 2750 | 2900 | 520 |

The data set forth in Table I show that the preferred class of anti-oxidant materials, for example, the aniline derivative of the reaction product of substantially two molecular proportions of beta-naphthol and substantially one molecular proportion of butyraldehyde, possess particularly desirable anti-oxidant properties.

Another example of the preferred class of anti-oxidants was prepared by reacting substantially two molecular proportions of beta-naphthol with substantially one molecular proportion of benzaldehyde and further reacting the product thus formed with substantially two molecular proportions of aniline in a manner analogous to that described above, except that the first formed reaction product was purified preferably by digesting with ethyl alcohol, and the heating of the reactants to form the reaction product with aniline was continued for only approximately three hours. The product thus prepared was compounded in a rubber stock comprising

```
100    parts of smoked sheet rubber,
 40      "    "  carbon black,
 10      "    "  zinc oxide,
  2      "    "  a blended mineral oil and rosin,
  3.25   "    "  sulfur,
  1    part   "  diphenylguanidine,
  1      "    "  the aniline derivative of the re-
                  action product of beta-naph-
                  thol and benzaldehyde, pre-
                  pared as described above.
```

The stock was then vulcanized by heating for different periods of time at the temperature given by 40 pounds of steam pressure per square inch. Portions of the stock thus cured were then artificially aged by heating in an oxygen bomb in the manner hereinbefore described for 39 hours at a temperature of 70° C. and under an oxygen pressure of 300 pounds per square inch. A comparison between the tensile and modulus properties of the aged and unaged vulcanized rubber product is given in Table II.

Table II

| Cure mins. | Hours aged | Modulus of elasticity in lbs/in² at elongations of— | | Tensile at break in lbs/in² | Ultimate elongation % |
|---|---|---|---|---|---|
| | | 300% | 500% | | |
| 30 | 0 | 871 | 2235 | 2865 | 590 |
| 30 | 39 | 700 | ----- | 1460 | 475 |
| 60 | 0 | 1335 | 3205 | 3945 | 590 |
| 60 | 39 | 1115 | 2120 | 2165 | 505 |
| 90 | 0 | 1620 | 3620 | 4055 | 535 |
| 90 | 39 | 1290 | ----- | 1990 | 440 |

From the data set forth in Table II it is apparent that the aniline derivative of the reaction product of beta-naphthol and benzaldehyde prepared in the manner described possesses the desirable anti-oxidant properties of the preferred class of compounds.

A further example of the preferred class of anti-oxidants was prepared in the following manner: Substantially two molecular proportions of beta-naphthol and substantially one molecular proportion of crotonaldehyde were placed in a suitable vessel and agitated together in the presence of a suitable solvent, for example, ethyl alcohol, and preferably also in the presence of a suitable catalyst, for example, hydrochloric acid, for a period of approximately 30 minutes and then heated preferably on a water bath for approximately one hour. The alcohol was then removed preferably by distillation and the product purified preferably by dissolving in an alkaline solution, and precipitating again by neutralizing with an acid. The precipitated product may then be further purified, if desired, by digesting with a suitable solvent, as for example benzol. Substantially one molecular proportion of the reaction product thus formed was then heated in a suitable vessel with an excess over two molecular proportions of aniline at a temperature of approximately 185 to 195° C. for a period of approximately four to five hours. The excess of aniline was then removed preferably by distillation in vacuo. The residue comprising the preferred material may, if desirable, be purified by digesting with a suitable solvent, as for example benzol. The product prepared as thus described was incorporated in a rubber stock comprising

```
100    parts of smoked sheet rubber,
 40      "    "  carbon black,
 10      "    "  zinc oxide,
  2      "    "  a blended mineral oil and rosin,
  3.25   "    "  sulfur,
  1    part   "  diphenylguanidine,
  1      "    "  the aniline derivative of the re-
                  action product of beta-naph-
                  thol and crotonaldehyde, pre-
                  pared as described above.
```

The stock was then vulcanized by heating for different periods of time at the temperature given by 40 pounds of steam pressure per square inch. Portions of the stock thus cured were artificially aged by heating in an oxygen bomb in the manner hereinbefore described for 39 hours at a temperature of 70° C. and under an oxygen pressure of 300 pounds per square inch. A comparison between the tensile and modulus properties of the aged and unaged vulcanized rubber product is given in Table III.

Table III

| Cure mins. | Hours aged | Modulus of elasticity in lbs/in² at elongations of— | | Tensile at break in lbs/in² | Ultimate elongation % |
|---|---|---|---|---|---|
| | | 300% | 500% | | |
| 30 | 0 | 1010 | 2560 | 3680 | 620 |
| 30 | 39 | 925 | 1940 | 1940 | 500 |
| 60 | 0 | 1560 | 3530 | 4360 | 575 |
| 60 | 39 | 1320 | ----- | 2140 | 460 |
| 90 | 0 | 1755 | 4010 | 4200 | 505 |
| 90 | 39 | 1485 | ----- | 1920 | 380 |

From the data set forth in Table III it is apparent that the aniline derivative of the reaction product of beta-naphthol and crotonaldehyde prepared as described above possesses the desirable anti-oxidant properties of the preferred class of compounds.

Other aldehydes than those hereinbefore mentioned may be reacted with alpha-naphthol or beta-naphthol in the proportion of substantially one molecular proportion of aldehyde to substantially two molecular proportions of naphthol and the products so formed may be further reacted with aniline or other aromatic amines to form further examples of the preferred class of compounds. As illustrations, acetaldehyde, heptaldehyde, and the like, may be reacted with a naphthol in the manner described, and the products thus formed may be reacted with aniline, toluidine, alpha-naphthylamine, beta-naphthylamine, and the like, and the materials so prepared employed as anti-oxidants in a rubber stock of vulcanization characteristics.

In the examples hereinbefore set forth, diphenylguanidine was employed as the accelerator, because it is known that a stock wherein it is employed possesses poor aging qualities. Other accelerators could, of course, have been employed in the tests hereinbefore described, resulting in different tensile and modulus figures than those hereinbefore set forth but still exhibiting the desirable anti-oxidant properties of the preferred class of compounds.

From the data hereinbefore set forth it is shown that the aromatic amino derivatives of a reaction product of a naphthol and an aldehyde containing more than one carbon atom, prepared in the manner described, comprise an important class of anti-oxidants which have been employed advantageously in a rubber stock.

The present invention is limited solely by the claims attached hereto as a part of the present specification, wherein it is intended to claim the invention as broadly as possible in view of the prior art.

What is claimed is:

1. The process of vulcanizing rubber which comprises heating rubber and sulfur in the presence of an anti-oxidant obtained by condensing substantially two molecular proportions of an aromatic primary amine with substantially one molecular proportion of a reaction product of substantially two molecular proportions of a naphthol and substantially one molecular proportion of an aldehyde containing more than three and less than eight carbon atoms.

2. The process of vulcanizing rubber which comprises heating rubber and sulfur in the presence of an anti-oxidant comprising a material produced by reacting substantially two molecular proportions of a naphthol with substantially one molecular proportion of an aldehyde containing more than three and less than eight carbon atoms and further reacting the product thus formed with substantially two molecular proportions of an aromatic primary amine containing one benzene nucleus.

3. The process of vulcanizing rubber which comprises heating rubber and sulfur in the presence of an anti-oxidant obtained by condensing substantially two molecular proportions of aniline with substantially one molecular proportion of a reaction product of substantially two molecular proportions of a naphthol and substantially one molecular proportion of an aldehyde containing more than three and less than eight carbon atoms.

4. The process of vulcanizing rubber which comprises heating rubber and sulfur in the presence of an anti-oxidant obtained by condensing substantially two molecular proportions of aniline with substantially one molecular proportion of a reaction product of substantially two molecular proportions of beta-naphthol and substantially one molecular proportion of an aldehyde containing more than three and less than eight carbon atoms.

5. The process of vulcanizing rubber which comprises heating rubber and sulfur in the presence of an anti-oxidant obtained by condensing substantially two molecular proportions of an aromatic primary amine with substantially one molecular proportion of a reaction product of substantially two molecular proportions of a naphthol and substantially one molecular proportion of an aldehyde containing four carbon atoms.

6. The process of vulcanizing rubber which comprises heating rubber and sulfur in the presence of an anti-oxidant obtained by condensing substantially two molecular proportions of aniline with substantially one molecular proportion of a reaction product of substantially two molecular proportions of beta-naphthol and substantially one molecular proportion of an aldehyde containing four carbon atoms.

7. The process of vulcanizing rubber which comprises heating rubber and sulfur in the presence of an anti-oxidant obtained by condensing substantially two molecular proportions of aniline with substantially one molecular proportion of a reaction product of substantially two molecular proportions of beta-naphthol and substantially one molecular proportion of butyraldehyde.

8. The process of vulcanizing rubber which comprises heating rubber and sulfur in the presence of an anti-oxidant comprising a material produced by reacting substantially two molecular proportions of beta-naphthol with substantially one molecular proportion of butyraldehyde and further reacting the product thus formed with substantially two molecular proportions of aniline.

9. The vulcanized rubber product prepared by heating rubber and sulfur in the presence of an anti-oxidant obtained by reacting substantially two molecular proportions of an aromatic primary amine with substantially one molecular proportion of a reaction product of substantially two molecular proportions of a naphthol and substantially one molecular proportion of an aldehyde containing more than three and less than eight carbon atoms.

10. The vulcanized rubber product prepared by heating rubber and sulfur in the presence of an anti-oxidant comprising a material produced by reacting substantially two molecular proportions of a naphthol with substantially one molecular proportion of an aldehyde containing more than three and less than eight carbon atoms and further reacting the product thus formed with substantially two molecular proportions of an aromatic primary amine containing one benzene nucleus.

11. The vulcanized rubber product prepared by heating rubber and sulfur in the presence of an anti-oxidant obtained by condensing substantially two molecular proportions of aniline with substantially one molecular proportion of a reaction product of substantially two molecular proportions of a naphthol and substantially one molecular proportion of an aldehyde containing more than three and less than eight carbon atoms.

12. The vulcanized rubber product prepared by heating rubber and sulfur in the presence of an anti-oxidant obtained by reacting substantially two molecular proportions of aniline with substantially one molecular proportion of a reaction product of substantially two molecular proportions of beta-naphthol and substantially one molecular proportion of an aldehyde containing more than three and less than eight carbon atoms.

13. The vulcanized rubber product prepared by heating rubber and sulfur in the presence of an anti-oxidant obtained by condensing substantially two molecular proportions of an aromatic primary amine with substantially one molecular proportion of a reaction product of substantially two molecular proportions of a naphthol and substantially one molecular proportion of an aldehyde containing four carbon atoms.

14. The vulcanized rubber product prepared by heating rubber and sulfur in the presence of an anti-oxidant obtained by condensing substantially two molecular proportions of aniline with substantially one molecular proportion of a reaction product of substantially two molecular proportions of beta-naphthol and substantially one molecular proportion of an aldehyde containing four carbon atoms.

15. The vulcanized rubber product prepared by heating rubber and sulfur in the presence of an anti-oxidant obtained by condensing substantially two molecular proportions of aniline with substantially one molecular proportion of a reaction product of substantially two molecular proportions of beta-naphthol and substantially one molecular proportion of butyraldehyde.

16. The vulcanized rubber product prepared by heating rubber and sulfur in the presence of an anti-oxidant comprising a material produced by reacting substantially two molecular proportions of beta-naphthol with substantially one molecular proportion of butyraldehyde and further reacting the product thus formed with substantially two molecular proportions of aniline.

17. The process of vulcanizing rubber which comprises heating rubber and sulfur in the presence of an antioxidant obtained by condensing substantially two molecular proportions of an aromatic primary amine with substantially one molecular proportion of a reaction product of substantially two molecular proportions of a naphthol and substantially one molecular proportion of a member of a group of aldehydes consisting in butyl aldehyde, croton aldehyde and benzaldehyde.

18. The vulcanized rubber product prepared by heating rubber and sulfur in the presence of an antioxidant obtained by condensing substantially two molecular proportions of an aromatic primary amine with substantially one molecular proportion of a reaction product of substantially two molecular proportions of a naphthol and substantially one molecular proportion of a member of a group of aldehydes consisting in butyl aldehyde, croton aldehyde and benzaldehyde.

19. The process of vulcanizing rubber which comprises heating rubber and sulfur in the presence of an anti-oxidant obtained by condensing substantially two molecular proportions of aniline with substantially one molecular proportion of a reaction product of substantially two molecular proportions of beta naphthol and substantially one molecular proportion of one member of a group of aldehydes consisting in butyl aldehyde, croton aldehyde and benzaldehyde.

20. The vulcanized rubber product prepared by heating rubber and sulfur in the presence of an anti-oxidant obtained by condensing substantially two molecular proportions of aniline with substantially one molecular proportion of a reaction product of substantially two molecular proportions of beta naphthol and substantially one molecular proportion of one member of a group of aldehydes consisting in butyl aldehydes, croton aldehyde and benzaldehyde.

ROBERT L. SIBLEY.